United States Patent
Lin et al.

(10) Patent No.: US 9,525,879 B2
(45) Date of Patent: Dec. 20, 2016

(54) METHOD AND APPARATUS FOR PARSING ERROR ROBUSTNESS OF TEMPORAL MOTION VECTOR PREDICTION

(71) Applicant: MediaTek Inc., Hsin-Chu (TW)

(72) Inventors: Jian-Liang Lin, Su' ao Township, Yilan County (TW); Yi-Wen Chen, Taichung (TW); Yu-Wen Huang, Taipei (TW); Chih-Ming Fu, Hsinchu (TW); Chi-Ling Wu, Taipei (TW); Yu-Pao Tsai, Kaohsiung (TW); Ching-Yeh Chen, Taipei (TW); Shaw-Min Lei, Zhubei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

(21) Appl. No.: 15/047,943

(22) Filed: Feb. 19, 2016

(65) Prior Publication Data
US 2016/0173872 A1    Jun. 16, 2016

Related U.S. Application Data

(63) Continuation of application No. 13/879,903, filed as application No. PCT/CN2012/070619 on Jan. 19, 2012, now Pat. No. 9,300,963.
(Continued)

(51) Int. Cl.
*H04N 11/02* (2006.01)
*H04N 19/109* (2014.01)
(Continued)

(52) U.S. Cl.
CPC .......... *H04N 19/109* (2014.11); *H04N 19/119* (2014.11); *H04N 19/139* (2014.11);
(Continued)

(58) Field of Classification Search
USPC ................................................... 375/240.16
See application file for complete search history.

(56) References Cited

U.S. PATENT DOCUMENTS

| | | | |
|---|---|---|---|
| 7,590,179 B2 * | 9/2009 | Mukerjee | H04N 19/105 375/240.12 |
| 7,817,717 B2 | 10/2010 | Malayath et al. | |

(Continued)

FOREIGN PATENT DOCUMENTS

| | | |
|---|---|---|
| CN | 1663280 | 8/2005 |
| CN | 102273206 | 12/2011 |

OTHER PUBLICATIONS

Liang, J.L., et al.; "Parsing Error Control for Advanced Motion Vector Prediction;" Joint Collaborative Team on Video Coding (JCT-VC) of ITU-T SG16 WP3 and ISO/IEC JTC1/SC29/WG11; Jan. 2011; pp. 1-3.
(Continued)

*Primary Examiner* — Leron Beck
(74) *Attorney, Agent, or Firm* — McClure, Qualey & Rodack, LLP

(57) ABSTRACT

A method and apparatus for deriving a motion vector predictor (MVP) are disclosed. The MVP is selected from spatial MVP and temporalone or more MVP candidates. The method determines a value of a flag in a video bitstream, where the flag is utilized for selectively disabling use of one or more temporal MVP candidates for motion vector prediction. The method selects, based on an index derived from the video bitstream, the MVP from one or more non-temporal MVP candidates responsive to the flag indicating that said one or more temporal MVP candidates are not to be utilized for motion vector prediction. Further, the method provides the MVP for the current block.

20 Claims, 2 Drawing Sheets

Related U.S. Application Data

(60) Provisional application No. 61/502,109, filed on Jun. 28, 2011, provisional application No. 61/452,533, filed on Mar. 14, 2011, provisional application No. 61/434,302, filed on Jan. 19, 2011.

(51) Int. Cl.

| | | |
|---|---|---|
| *H04N 19/52* | (2014.01) | |
| *H04N 19/65* | (2014.01) | |
| *H04N 19/895* | (2014.01) | |
| *H04N 19/119* | (2014.01) | |
| *H04N 19/139* | (2014.01) | |
| *H04N 19/147* | (2014.01) | |
| *H04N 19/174* | (2014.01) | |
| *H04N 19/177* | (2014.01) | |
| *H04N 19/184* | (2014.01) | |
| *H04N 19/567* | (2014.01) | |
| *H04N 19/593* | (2014.01) | |
| *H04N 19/615* | (2014.01) | |
| *H04N 19/70* | (2014.01) | |

(52) U.S. Cl.
CPC ......... *H04N 19/147* (2014.11); *H04N 19/174* (2014.11); *H04N 19/177* (2014.11); *H04N 19/184* (2014.11); *H04N 19/52* (2014.11); *H04N 19/567* (2014.11); *H04N 19/593* (2014.11); *H04N 19/615* (2014.11); *H04N 19/65* (2014.11); *H04N 19/70* (2014.11); *H04N 19/895* (2014.11)

(56) References Cited

U.S. PATENT DOCUMENTS

| | | | | |
|---|---|---|---|---|
| 8,976,863 | B2 * | 3/2015 | Kim ................... | H04N 19/52 375/240.01 |
| 2003/0215014 | A1 * | 11/2003 | Koto .................. | H04N 19/105 375/240.16 |
| 2004/0047418 | A1 * | 3/2004 | Tourapis .......... | H04N 19/00684 375/240.16 |
| 2004/0086047 | A1 * | 5/2004 | Kondo ................ | H04N 19/521 375/240.16 |
| 2005/0232358 | A1 | 10/2005 | Nicolas | |
| 2007/0171977 | A1 | 7/2007 | Kudo et al. | |
| 2008/0031341 | A1 * | 2/2008 | Jeon .................... | H04N 19/521 375/240.16 |
| 2008/0240242 | A1 * | 10/2008 | Lainema ............ | H04N 19/52 375/240.16 |
| 2010/0215101 | A1 * | 8/2010 | Jeon .................... | H04N 19/105 375/240.12 |
| 2011/0176611 | A1 * | 7/2011 | Huang ................. | H04N 19/56 375/240.16 |
| 2011/0176615 | A1 * | 7/2011 | Lee ..................... | H04N 19/52 375/240.16 |
| 2012/0075535 | A1 * | 3/2012 | Van Beek ............ | H04N 5/145 348/699 |
| 2012/0082228 | A1 * | 4/2012 | Su et al. ............. | H03M 7/4031 375/240.16 |
| 2012/0177123 | A1 * | 7/2012 | Zhou .................... | H04N 19/52 375/240.16 |
| 2012/0177125 | A1 * | 7/2012 | Sugio .................. | H04N 19/52 375/240.16 |
| 2012/0314027 | A1 * | 12/2012 | Tian .................... | H04N 7/181 348/43 |
| 2012/0320984 | A1 * | 12/2012 | Zhou .................... | H04N 19/50 375/240.16 |
| 2015/0288984 | A1 | 10/2015 | Kim et al. | |

OTHER PUBLICATIONS

Francois, E., et al.; "Robust solution for the AMVP parsing issue;" Joint Collaborative Team on Video Coding (JCT-VC) of ITU-T SG16 WP3 and ISO/IEC JTC1/SC29/WG11; Mar. 2011; pp. 1-7.

* cited by examiner

| seq_parameter_set_rbsp( ) { | C | Descriptor |
|---|---|---|
| ... | | |
| temporal_mvp_candidates_not_used | 1 | u(1) |
| if( !temporal_mvp_candidates_not_used ) | | |
|   temporal_mvp_candidates_not_used_in_ref_pic | 1 | u(1) |
| ... | | |
| } | | |

*Fig. 3*

| slice_header( ) { | C | Descriptor |
|---|---|---|
| ... | | |
| if(!temporal_mvp_candidates_not_used<br>  && !temporal_mvp_candidates_not_used_in_ref_pic ) | | |
|   temporal_mvp_candidates_not_used_in_slice | 2 | u(1) |
| ... | | |
| } | | |
| | | |

*Fig. 4*

METHOD AND APPARATUS FOR PARSING ERROR ROBUSTNESS OF TEMPORAL MOTION VECTOR PREDICTION

CROSS REFERENCE TO RELATED APPLICATIONS

The present invention is a Continuation application of pending U.S. application Ser. No. 13/879,903, filed on Apr. 17, 2013, which is a National Stage Entry of PCT Application No. PCT/CN2012/070619, filed on Jan. 19, 2012, which claimed priority to U.S. Provisional Patent Application No. 61/434,302, filed Jan. 19, 2011, entitled "Syntax for AMVP Parsing Error Control", U.S. Provisional Patent Application No. 61/452,533, filed Mar. 14, 2011, entitled "Constrained Usage of Temporal MV and MVP Candidates", and U.S. Provisional Patent Application No. 61/502,109, filed Jun. 28, 2011, entitled "Method for Parsing Robustness and the Control Flag for the Availability of the Temporal Motion Vector Predictor".

The present invention is contains subject matter that is related to the subject matter of U.S. Non-Provisional patent application Ser. No. 13/206,891, filed Aug. 10, 2011, entitled "Method and Apparatus for Derivation of MV/MVP Candidate for Inter/Skip/Merge Modes" and U.S. Non-Provisional patent application Ser. No. 13/177,808, filed Jul. 7, 2011, entitled "Method and Apparatus for Derivation of Spatial Motion Vector Candidate and Motion Vector Prediction Candidate". The U.S. Provisional Patent Application and US Non-Provisional patent applications are hereby incorporated by reference in their entireties.

FIELD OF THE INVENTION

The present invention relates to video coding. In particular, the present invention relates to coding techniques associated with parsing error robustness of temporal motion vector prediction.

BACKGROUND

In video coding systems, spatial and temporal redundancy is exploited using spatial and temporal prediction to reduce the information to be transmitted. The spatial and temporal prediction utilizes decoded pixels from the same picture (Intra) and reference pictures (Inter) respectively to form prediction for current pixels to be coded. In a conventional coding system, side information associated with spatial and temporal prediction may have to be transmitted, which will take up some bandwidth of the compressed video data. The transmission of motion vectors for inter-frame coding may require a noticeable portion of the compressed video data, particularly in low-bitrate applications. To further reduce the bitrate associated with motion vectors, a technique called Motion Vector Prediction (MVP) has been used in the field of video coding in recent years. The MVP technique exploits the statistic redundancy among motion vectors from neighboring blocks (spatial) and co-located blocks (temporal). In High-Efficiency Video Coding (HEVC), temporal MVP candidates are included to increase coding efficiency. However, an error in the bitstream may cause syntax elements associated with a temporal MVP to be incorrectly parsed. Video quality may be impacted for multiple frames. Therefore, it is

BRIEF SUMMARY OF THE INVENTION

A method and apparatus for deriving a motion vector predictor (MVP) for an MV of a current block in Inter, Merge, or Skip mode are disclosed. The MVP is selected from MVP candidates comprising one or more spatial MVP candidates associated with one or more neighboring blocks and one or more temporal MVP candidates associated with one or more co-located blocks. In one embodiment according to the present invention, the method and apparatus for deriving an MVP for an MV of a current block in Inter, Merge, or Skip mode comprise: determining a value of a flag in a video bitstream, wherein the flag is utilized for selectively disabling use of one or more temporal MVP candidates for motion vector predictiondetermining whether said one or more temporal MVP candidates are disabled according to a flag in a video bitstream; selecting deriving the MVP from one or more non-temporal MVP candidates responsive to the flag indicating that said one or more temporal MVP candidates are not to be utilized for motion vector prediction, wherein the selection is based on an index derived from the video bitstreambased on said one or more spatial MVP candidates if the flag indicated that said one or more temporal MVP candidates are disabled; deriving the MVP based on said one or more spatial MVP candidates and said one or more temporal MVP candidates if the flag indicated that said one or more temporal MVP candidates are enabled and providing the MVP for the current block. In another embodiment, the method further comprises a step of determining a forced temporal MVP when a temporal MVP is not available and the temporal MVP candidates are enabled as indicated by the flag, wherein the forced temporal MVP is used in said deriving the MVP if the temporal MVP candidates are enabled as indicated by the flag. In yet another embodiment, the method further comprises a step of skipping MV-based spatial redundant MVP removal, wherein the MV-based spatial redundant MVP removal determines a spatial redundant MVP by comparing an MV value of a currently determined MVP with an MV value of a previously determined MVP.

One aspect of the present invention addresses various schemes to incorporate the flag. The flag may be in the sequence level, picture level or slice level. Multiple flags may also be used in multiple levels to provide more flexible control regarding whether the temporal MVP candidates are disabled (or disallowed). The flag may also be implicitly derived based on coding parameters.

BRIEF DESCRIPTION OF THE DRAWINGS

FIG. 3 illustrates an exemplary syntax design at the sequence level according to an embodiment of the present invention.

FIG. 4 illustrates an exemplary syntax design at slice level according to an embodiment of the present invention.

DETAILED DESCRIPTION OF THE INVENTION

High-Efficiency Video Coding (HEVC) is a new international video coding standard that is being developed by the Joint Collaborative Team on Video Coding (JCT-VC).

HEVC is based on the hybrid block-based motion-compensated DCT-like transform coding architecture. The basic unit for compression, termed coding unit (CU), is a 2N×2N square block, and each CU can be recursively split into four smaller CUs until a predefined minimum size is reached. Each CU contains one or multiple prediction units (PUs). The PU sizes can be 2N×2N, 2N×N, N×2N, and N×N.

HEVC adopts the MVP technique to increase the coding efficiency of motion vector coding, where the motion vector competition (MVC) based scheme is applied to select one motion vector predictor (MVP) among a given candidate set of MVPs. The MVP candidate set includes spatial and temporal MVPs. Furthermore, there are three inter-prediction modes including Inter, Skip, and Merge in the HEVC Test Model Version 3.0 (HM-3.0). The Inter mode performs motion-compensated prediction and the motion information transmitted is associated with motion vector differences (MVDs). The MVDs can be used together with MVPs to derive motion vectors (MVs). The Skip and Merge modes utilize inference methods to obtain the motion information, where MV is equal to MVP+MVD with zero MVD. The MVP can be determined from spatially neighboring blocks (spatial candidates) or temporal blocks (temporal candidate) located in a co-located picture. The co-located picture is the first reference picture in list 0 or list 1, which is signaled in the slice header in HM-3.0. When a PU is coded in either Skip or Merge mode, no motion information is transmitted except for the index of the selected candidate. In the case of a Skip PU, the residual signal is also omitted.

Figure 1:
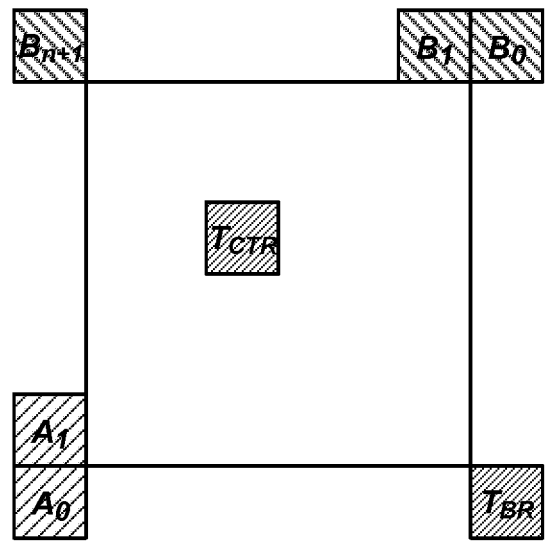
FIG. 1 illustrates neighboring block and co-located block configuration for deriving spatial/temporal motion vector prediction candidate for Inter mode according to High Efficient Video Coding Test Model Version 3.0 (HM-3.0).

For the Inter mode in HM-3.0, the advanced motion vector prediction (AMVP) scheme is used to select a motion vector predictor among the AMVP candidate set including two spatial MVPs and one temporal MVP. The reference picture index is explicitly transmitted to the decoder. The MVP is then selected among the candidate set for a given reference picture index. The neighboring spatial blocks and co-located temporal blocks used to determine candidate MVPs are shown in FIG. 1. The MVP candidate set for the Inter mode in HM-3.0 includes two spatial MVPs and one temporal MVP:

1. Left spatial predictor (the first available one from $A_0$ and $A_1$),
2. Top spatial predictor (the first available one from $B_0$, $B_1$ and $B_{n+1}$), and
3. Temporal predictor (the first available one from $T_{BR}$ and $T_{CTR}$).

The temporal predictor is derived from a block ($T_{BR}$ or $T_{cTR}$) located in a co-located picture, where the co-located picture is the first reference picture in list 0 or list 1. Since the block where a temporal MVP is located may have two MVs: one from list 0 and the other from list 1, the temporal MVP is derived from the MV from list 0 or list 1 according to the following rule:

1. The MV that crosses the current picture is chosen first; and
2. If both MVs cross the current picture or both do not cross the current picture, the one with the same reference list as the current list will be chosen.

Figure 2:
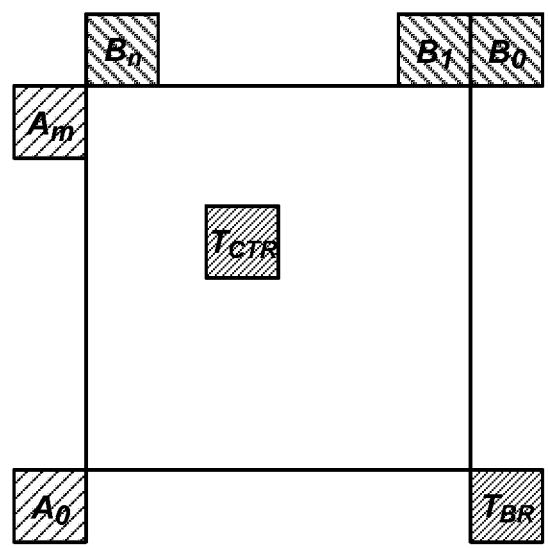
FIG. 2 illustrates neighboring block and co-located block configuration for deriving spatial/temporal motion vector prediction candidate for Skip and Merge modes according to High Efficient Video Coding Test Model Version 3.0 (HM-3.0).

In HM-3.0, if a block is encoded as Skip or Merge mode, an MVP index is signaled to indicate which MVP among the MVP candidate set is used for the block to be merged. The Merge mode reduces required bitrate by sharing motion information, where each merged PU reuses the MV, prediction direction, and reference picture index of the selected candidate of a respective block. In HM-3.0, the reference picture index is always set to the first reference picture if the selected MVP is a temporal MVP. The candidate set of MVPs for the Skip and Merge modes includes four spatial MVPs and one temporal MVP as shown in FIG. 2:

1. Left spatial predictor ($A_m$),
2. Top spatial predictor ($B_n$),
3. Temporal predictor (the first available one from $T_{BR}$ and $T_{cTR}$),
4. Above-right spatial predictor ($B_0$), and
5. Below-left spatial predictor ($A_0$).

In HM-3.0, zero MV is added to the candidate set when no candidate can be inferred in Inter, Skip, or Merge mode.

Determining a final MVP among the MVP candidate set can be made based on a performance criterion. For example, rate-distortion optimization (RDO) decision is adopted in HM-3.0 for the encoder to select one final MVP within a given candidate set of MVPs for Inter, Skip, or Merge modes. During the process of determining a final MVP among the candidate set, a selected MVP in an intermediate stage may be the same as a previously selected one. Since the selected MVP in the intermediate stage is the same as one selected before, it does not help to improve the chance for a better MVP candidate. Accordingly, the redundant MVP is removed from the candidate as a final MVP. For example, the top spatial predictor selected from $B_0$, $B_1$, and $B_{n+1}$ may be the same as the left spatial predictor selected from $A_0$ and $A_1$. The MVP from the top spatial predictor becomes redundant and will be removed. After a final MVP is determined, an index of the selected MVP is incorporated in the bitstream for the decoder to identify the selected MVP. While the temporal MVP included in the candidate sets of MVPs can improve coding efficiency, an error in temporal MVP may cause decoding artifacts to last for multiple frames. When errors occur in the bitstream, the temporal MVP may not be correctly recovered. For example, if the MV of a previous picture cannot be decoded correctly, a mismatch between the candidate set on the encoder side and the decoder side may occur. The mismatch will result in parsing error of the index of the best MVP candidate. Accordingly, the rest of the current picture may not be parsed or decoded properly. Furthermore, this parsing error will affect subsequent inter-coded pictures that also allow temporal MVP candidates. Therefore, one small decoding error of an MV may cause parsing failure for multiple subsequent pictures.

In order to compress the memory of storing the data associated with MVs in a coded picture for using temporal MVPs, a tool of memory compression, named motion data storage reduction (MDSR), was adopted in HM-3.0. According to the MDSR method, MV data of one block in an MDSR unit will be used as the representative MV data for the entire MDSR unit. The MV data for other blocks in the MDSR will be discarded. When MDSR is used, the error propagation issue associated with temporal MVP error still remains. As mentioned earlier, an erroneous MV on the decoder side may cause a parsing error in successive pictures. Consequently, the decoder may remove an MVP mistakenly, or keep a redundant MVP which should have been removed. In order to avoid the parsing problem caused by incorrect MV data, a robust coding method should bypass the step of removing redundant MVPs. Furthermore, the parsing robustness solution needs to force the temporal MVP to be available. To overcome the issue of error propagation associated with temporal MVP without sacrificing much coding efficiency, embodiments according to the present invention employs a flag to selectively disable the temporal MVP. Several schemes to achieve error robust parsing for MVP are disclosed in this application.

In one embodiment according to the present invention, a flag is used to determine whether temporal MVP candidates are disabled. If the flag indicated that temporal MVP candidates are disabled, the MVP is derived based on spatial MVP candidates only. If the flag indicated that temporal MVP candidates are enabled, the MVP is derived based on spatial MVP candidates and temporal MVP candidates. To further improve the parsing error robustness, the step of removing redundant spatial MVP by comparing the MV values is skipped so that the decoder will not remove an MVP mistakenly, or keep a redundant MVP that should have been removed. Furthermore, the flag can be in the sequence, picture or slice header to control the availability of the temporal MVP in the entire sequence, picture, or slice. When the flag indicates temporal MVP disabled, there is no need to check for redundant temporal MVP since there are no temporal MVP candidates. On the other hand, if the temporal MVP is not disabled as indicated by the flag, the parsing robustness scheme needs to force the temporal MVP to be available regardless whether the temporal MVP can be derived from a reference block in a co-located picture or not, unless the reference block is outside the boundary of the co-located picture. For example, even if the block in the co-located picture is an Intra block, the parsing robustness scheme still forces the temporal MVP to be available in order to prevent the case that the mode type (Inter or Intra) of the reference block in the co-located picture is lost or wrong. When the step of removing redundant spatial MVP according to MV value comparison is skipped, the parsing-error robustness scheme may choose to skip the step of removing redundant spatial MVP or to perform the step of removing redundant spatial MVP according to a decision method other than comparing the MV values. Examples of the non-MV-comparison based decision method may include removing redundant MVPs within the same PU, removing redundant MVPs within the same MDSR (motion data storage reduction) unit and with the same reference index, and removing redundant MVPs caused by Merge.

A default temporal MVP, such as a zero MV, may be used as the forced temporal MVP in the forced temporal MVP case. In order to operate the coding system properly, the decoder should be configured to use the same default temporal MVP as the encoder in the forced temporal MVP case. The use of the flag to disallow temporal MVP may be dependent on coding parameters. For example, PUs in a current slice can find their respective co-located PUs in one or more co-located slices in the co-located picture. If all the co-located slices of the current slice are I-slices, the flag for the current slice should be selected to disable the temporal MVP. Otherwise, the flag can be transmitted to enable the temporal MVP. An Intra picture can also be determined based on Intra period or Group of Picture (GOP) structure. When the reference picture is an Intra picture, the flag for the slices associated with the Intra-picture should be selected to disable the temporal MVP.

In another embodiment according to the present invention, the error protection scheme for parsing robustness implicitly derives a flag to control the availability of the temporal MVP in the entire sequence, picture, or slice. Similar to the previous embodiment, the step of removing redundant spatial MVP by comparing the MV values is skipped so that the decoder will not remove an MVP mistakenly, or keep a redundant MVP which should have been removed. There are various ways to implicitly derive the flag. For example, the information of the Intra period or the GOP structure can be signaled at sequence level so that the flag can be implicitly derived at the decoder side without sending the control flag for each slice or picture. In another example, when the slice header is highly protected, the information in the slice header of co-located picture will always be available at the decoder side. Under this assumption, if the co-located picture/slice is an Intra picture/slice, the control flag can be determined accordingly to disable the temporal MVP. Otherwise, the parsing robustness solution forces the temporal MVP to be available regardless whether the MVP can be derived from a reference block in a co-located picture or not unless the reference block is outside the boundary of the co-located picture.

While the neighboring/co-located block configuration shown in FIG. 1 and FIG. 2 are used as exemplary spatial/temporal MVP candidates for Inter and Skip/Merge modes respectively, other block configurations for spatial/temporal MVP candidates may also be used to practice the present invention. Furthermore, while the MVP selection procedure based on spatial/temporal MVP candidates are described above for Inter and Skip/Merge modes, other MVP selection procedure may also be used to practice the present invention.

When a flag is used to indicate whether temporal MVP is allowed, the flag may be incorporated in the bitstream corresponding to various levels. An exemplary syntax design to support the flag for enabling control of temporal MVP is disclosed in the JCTVC-D126 publication by the inventors ("Syntax for AMVP Parsing Error Control", by Jian-Liang Lin, et al., Joint Collaborative Team on Video Coding (JCT-VC) of ITU-T SG16 WP3 and ISO/IEC JTC1/SC29/WG11, 4th Meeting: Daegu, KR, 20-28 Jan., 2011, Document: JCTVC-D126). FIG. 3 illustrates an example of syntax design as described in the JCTVC-D126 publication, where only syntax elements related to the temporal MVP enabling control are shown. A first flag, temporal_mvp_candidates_not_used, is transmitted in the sequence parameter set (SPS) to indicate whether temporal MVP candidates for the entire sequence are disabled (or disallowed). When the first flag is enabled, i.e., temporal_mvp_candidates_not_used has a value of 1, only spatial MVP is allowed. Therefore, parsing error will not propagate from frame to frame since the temporal MVP is not used. However, the coding efficiency may be noticeably decreased. In order to reduce the degradation in coding efficiency, a second flag, temporal_mvp_candidates_not_used_in_ref_pic, may be transmitted in the SPS to disallow temporal MVP candidates for reference pictures when the first flag is disabled. When the second flag is enabled, i.e., temporal_mvp_candidates_not_used_in_ref_pic has a value of 1, temporal MVP candidates will only be disabled (or disallowed) for reference pictures instead of all pictures in the sequence. Therefore, the second flag provides a trade-off between the parsing error resilience and the coding efficiency. When temporal_mvp_candidates_not_used equals to 1, the value of temporal_mvp_candidates_not_used_in_ref_pic is set to 1. When the second flag is enabled, parsing error will not propagate from prior pictures to the reference picture since the temporal MVP is not used for the reference pictures. Only a non-reference picture may still use temporal MVP candidates and may cause parsing error propagation. However, the parsing error in any prior picture will be terminated at reference pictures. Since temporal MVP candidates are only disabled (or disallowed) for the reference pictures, the coding efficiency will be improved over the case that temporal MVP candidates are disabled (or disallowed) for the entire sequence.

A third flag, temporal_mvp_candidates_not_used_in_slice, is transmitted in the slice header to disallow temporal MVP candidates for the current slice when both the first flag and the second flag are disabled as shown in FIG. 4. The third flag can provide fine granularity of trade-off between parsing error resilience and coding efficiency since the decision of whether to disallow temporal MVP candidates or not is made on the slice level. When the third flag is enabled for a slice, parsing error will not propagate from a slice in a prior picture to the slice since the parsing error in any prior slice will be terminated by the current slice.

The coding efficiency, encoding time and decoding timing for embodiments of the present invention are compared with these of a conventional approach where temporal MVP candidates are always allowed. The comparisons are conducted for coding systems with different configurations, including High-Efficiency Random-Access (HE-RA) and Low-Complexity Random-Access (LC-RA). The difference in coding efficiency is represented in BD-Rate for Y, U and V components, where a positive BD-Rate means increased bitrate compared with the conventional approach. Class A through Class E are different test sequence sets used for the performance comparison. Results for the embodiment that disallows temporal MVP candidates for all pictures in the sequence are shown in Table 1. The average degradation over all Classes in coding efficiency for YUV components and various system configurations is from 1.2% to 1.7%. Table 2 illustrates the results for the embodiment where temporal MVP candidates are only disabled (or disallowed) for reference pictures. The average degradation over all Classes in coding efficiency for YUV color components and various system configurations is from 0.6% to 0.7%.

TABLE 1

|  | HE-RA | | | LC-RA | | |
| --- | --- | --- | --- | --- | --- | --- |
|  | Y BD-rate | U BD-rate | V BD-rate | Y BD-rate | U BD-rate | V BD-rate |
| Class A | 1.3 | 0.8 | 1.1 | 1.6 | 1.3 | 1.7 |
| Class B | 2.1 | 1.4 | 1.4 | 1.9 | 0.7 | 1.0 |
| Class C | 1.4 | 1.4 | 1.4 | 1.3 | 1.4 | 1.3 |
| Class D | 1.7 | 1.8 | 1.7 | 1.7 | 1.4 | 1.5 |
| Class E |  |  |  |  |  |  |
| All | 1.7 | 1.3 | 1.4 | 1.6 | 1.2 | 1.4 |
| Enc Time [%] |  | 95% |  |  | 97% |  |
| Dec Time[%] |  | 98% |  |  | 97% |  |

TABLE 2

|  | HE-RA | | | LC-RA | | |
| --- | --- | --- | --- | --- | --- | --- |
|  | Y BD-rate | U BD-rate | V BD-rate | Y BD-rate | U BD-rate | V BD-rate |
| Class A | 0.5 | 0.3 | 0.6 | 0.6 | 0.7 | 1.0 |
| Class B | 1.0 | 0.7 | 0.7 | 0.9 | 0.4 | 0.7 |
| Class C | 0.5 | 0.5 | 0.4 | 0.3 | 0.5 | 0.3 |
| Class D | 0.7 | 0.9 | 0.8 | 0.7 | 0.7 | 0.8 |
| Class E |  |  |  |  |  |  |
| All | 0.7 | 0.6 | 0.6 | 0.6 | 0.6 | 0.7 |
| Enc Time [%] |  | 97% |  |  | 98% |  |
| Dec Time [%] |  | 99% |  |  | 98% |  |

The exemplary syntax design in FIG. 3 and FIG. 4 illustrates three flags to control whether to allow temporal MVP candidates for the sequence, the reference pictures and slices respectively. Any flag or any combination of the flags may be used to practice the present invention. While embodiments of the present invention control whether to allow temporal MVP candidates for the sequence, the reference pictures or slices, the present invention may also be practiced using other arrangement for disallowing temporal MVP candidates. For example, temporal MVP candidates may be disabled (or disallowed) periodically. Accordingly, temporal MVP candidates may be disabled (or disallowed) for every fourth, eighth or sixteenth picture. For another example, temporal MVP candidates may be disabled in multiple successive pictures. Accordingly, temporal MVP candidates may be disabled in two successive pictures or four successive pictures. In one embodiment, the number of successive pictures may be the number of reference pictures in the reference list.

Embodiment of MVP derivation according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of deriving a motion vector predictor (MVP) for a motion vector (MV) of a current block in Inter, Merge, or Skip mode, the method comprising:
   determining a value of a flag in a video bitstream, wherein the flag is utilized for selectively disabling use of one or more temporal MVP candidates for motion vector prediction;
   selecting, based on an index derived from the video bitstream, the MVP from one or more non-temporal MVP candidates responsive to the flag indicating that said one or more temporal MVP candidates are not to be utilized for motion vector prediction; and
   providing the MVP for the current block.

2. The method of claim 1 further comprising:
   selecting, based on the index derived from the video bitstream, the MVP from said one or more non-temporal MVP candidates and one or more available temporal MVP candidates responsive to the flag indicating that said one or more temporal MVP candidates are to be utilized for motion vector prediction.

3. The method of claim 2, wherein said one or more available temporal MVP candidates are associated with one or more co-located blocks in a co-located picture.

4. The method of claim 2, wherein said one or more available temporal MVP candidates are one or more default temporal MVP candidates if all motion vectors associated with one or more co-located blocks in a co-located picture are not available.

5. The method of claim 1, the flag is in a sequence level, wherein the flag is used to indicate that said one or more temporal MVP candidates are not to be utilized for motion vector prediction for an entire sequence.

6. The method of claim 5, wherein a second flag exists in a picture level or a slice level, and wherein the second flag is used to indicate that said one or more temporal MVP candidates are not to be utilized for motion vector prediction for the picture or the slice respective.

7. The method of claim 5, wherein a second flag exists in a picture level or a slice level responsive to the flag indicating that said one or more temporal MVP candidates are to be utilized for motion vector prediction, and wherein the second flag is used to indicate that said one or more temporal MVP candidates are not to be utilized for motion vector prediction for the picture or the slice respective.

8. The method of claim 7, wherein the second flag does not exist in a picture level or a slice level responsive to the flag indicating that said one or more temporal MVP candidates are not to be utilized for motion vector prediction, and wherein the second flag is used to indicate that said one or more temporal MVP candidates are not to be utilized for motion vector prediction for the picture or the slice respective.

9. The method of claim 1, the flag is in a picture level, wherein the flag is used to indicate said one or more temporal MVP candidates are not to be utilized for motion vector prediction for an entire picture.

10. The method of claim 1, the flag is in a slice level, wherein the flag is used to indicate said one or more temporal MVP candidates are not to be utilized for motion vector prediction for a slice.

11. An apparatus for deriving a motion vector predictor (MVP) for a motion vector (MV) of a current block in Inter, Merge, or Skip mode, the apparatus comprising at least one circuit configured to:
determine a value of a flag in a video bitstream, wherein the flag is utilized for selectively disabling use of one or more temporal MVP candidates for motion vector prediction;
select, based on an index derived from the video bitstream, the MVP from one or more non-temporal MVP candidates responsive to the flag indicating that said one or more temporal MVP candidates are not to be utilized for motion vector prediction; and
provide the MVP for the current block.

12. The apparatus of claim 11, wherein the apparatus further comprising at least one circuit configured to:
select, based on the index derived from the video bitstream, the MVP from said one or more non-temporal MVP candidates and one or more available temporal MVP candidates responsive to the flag indicating that said one or more temporal MVP candidates are to be utilized for motion vector prediction.

13. The apparatus of claim 12, wherein said one or more available temporal MVP candidates are associated with one or more co-located blocks in a co-located picture.

14. The apparatus of claim 12, wherein said one or more available temporal MVP candidates are one or more default temporal MVP candidates if all motion vectors associated with one or more co-located blocks in a co-located picture are not available.

15. The apparatus of claim 11, the flag is in a sequence level, wherein the flag is used to indicate that said one or more temporal MVP candidates are not to be utilized for motion vector prediction for an entire sequence.

16. The apparatus of claim 15, wherein a second flag exists in a picture level or a slice level, and wherein the second flag is used to indicate that said one or more temporal MVP candidates are not to be utilized for motion vector prediction for the picture or the slice respective.

17. The apparatus of claim 15, wherein a second flag exists in a picture level or a slice level responsive to the flag indicating that said one or more temporal MVP candidates are to be utilized for motion vector prediction, and wherein the second flag is used to indicate that said one or more temporal MVP candidates are not to be utilized for motion vector prediction for the picture or the slice respective.

18. The apparatus of claim 17, wherein the second flag does not exist in a picture level or a slice level responsive to the flag indicating that said one or more temporal MVP candidates are not to be utilized for motion vector prediction, and wherein the second flag is used to indicate that said one or more temporal MVP candidates are not to be utilized for motion vector prediction for the picture or the slice respective.

19. The apparatus of claim 11, the flag is in a picture level, wherein the flag is used to indicate said one or more temporal MVP candidates are not to be utilized for motion vector prediction for an entire picture.

20. The apparatus of claim 11, the flag is in a slice level, wherein the flag is used to indicate said one or more temporal MVP candidates are not to be utilized for motion vector prediction for a slice.

* * * * *